COMPARATOR DEVICE

Filed April 12, 1954

INVENTORS
JEROME W. STAFFORD
KENNETH M. FRIERSON
BY Lyon & Lyon
ATTORNEYS

United States Patent Office 2,774,056

Patented Dec. 11, 1956

2,774,056

COMPARATOR DEVICE

Jerome W. Stafford, Hollywood, and Kenneth M. Frierson, Los Angeles, Calif., assignors to Loew's Incorporated, Culver City, Calif., a corporation of Delaware Application April 12, 1954, Serial No. 422,472

4 Claims. (Cl. 340—149)

Figures 1, 2:
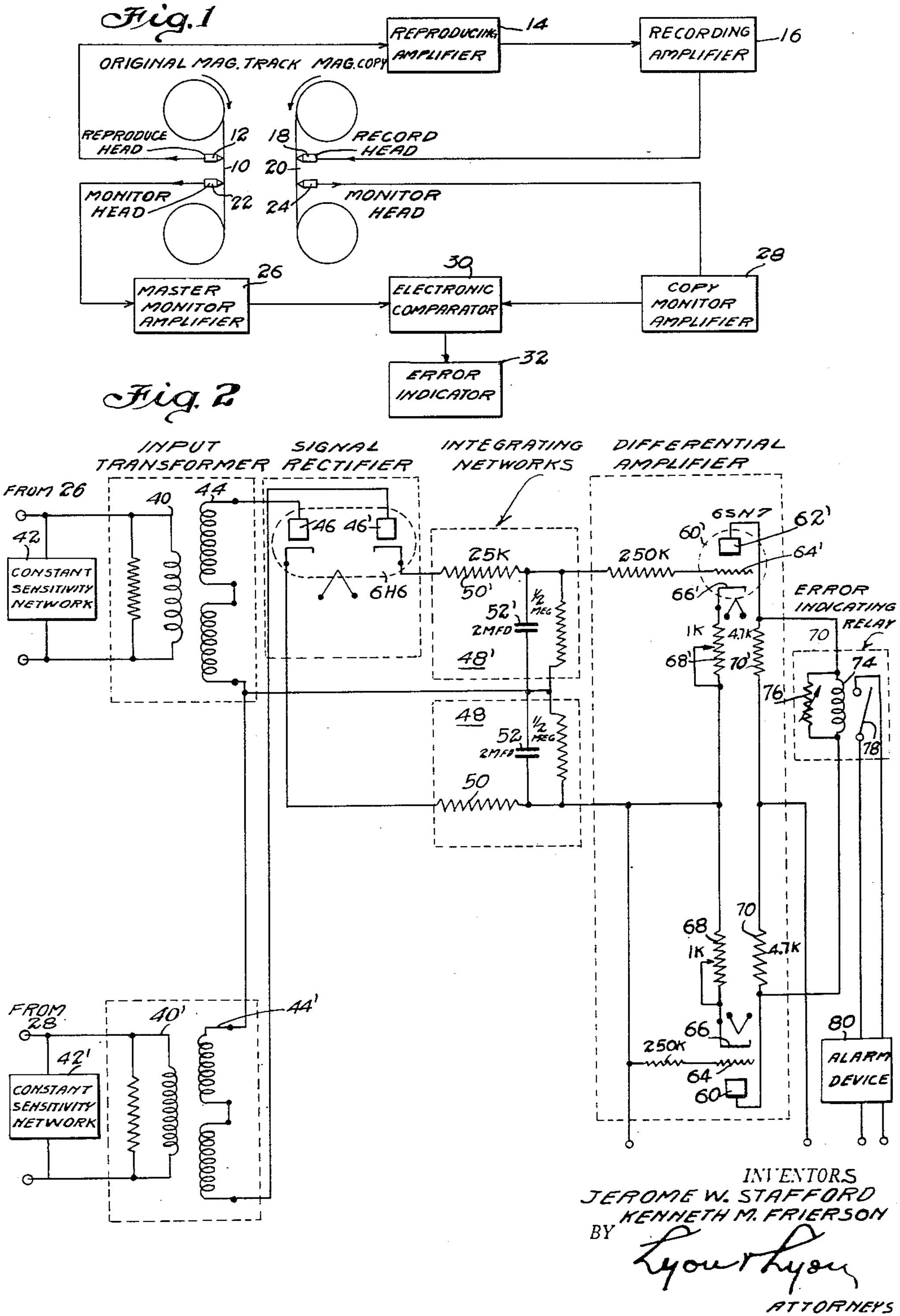

In the motion-picture industry, it is the practice to make a great number of copies on film of an original for distribution to exhibitors. The sound accompanying a picture is recorded on one or more magnetic material strips or tracks alongside of the picture frames on the film.

One system presently used for making copies on magnetic tape, or on the magnetic track on film, of the signals recorded on a master magnetic tape or track is to read the signals on the master tape, amplify them, and record them on the magnetic tape or track which serves as the copy of the original. Of course, any desired number of reproductions may be made simultaneously from the master. It is desirable to determine whether or not such reproductions are being made accurately, and to determine the occurrence of an error or defect in the recording or trouble in the recording mechanism at the time these occur, in order to avoid subsequent recording until the troubles are corrected. Heretofore, the copy would be monitored either while it was being made or thereafter, using an audio reproducing device. This, however, does not provide too faithful a check and requires the attention of a listener at all times, with consequent slow running of the recording medium at the audio signal reproducing speed.

An object of the present invention is to provide a new and improved automatic inspection system for comparing the signals recorded on one recording medium from a master recording medium while such recording is occurring.

Another object of the present invention is to provide an accurate inspection system for comparing the signals which have just been recorded on a recording medium with the signals on the medium from which they have been recorded.

Still a further object of the present invention is to provide a new, useful, and simple automatic inspection system for determining the accuracy of the reproduction on a copy magnetic tape or track made from a master magnetic tape or track.

Another object of this invention is to provide a means for comparing any sound record with its master, such as a phonograph record with its master pressing, or a photographic sound record with its master print.

Still another object of the present invention is to provide apparatus for comparing a sound copy in one medium with its master in another medium, such as a phonographic record with its magnetic or photographic master on film.

Yet another object of the present invention is to provide apparatus for checking video signals which have been recorded on magnetic tape.

These and other objects of the invention are achieved by providing a first checkup head in proximity to the recording medium which reads signals which have already been recorded on the second medium. A second pickup head is applied to the second recording medium to read signals corresponding to those being read from the first recording medium. The outputs developed by these two pickup heads are applied, after suitable amplification, to individual rectifiers. The outputs from these rectifiers are applied to individual integrating networks. The outputs from the integrating networks are algebraically combined and then applied to apparatus for manifesting an indication, should a difference between the two occur.

The novel features that are considered characteristic of this invention are set forth with particularity in the appended claims. The invention, itself, both as to its organization and method of operation, as well as additional objects and advantages thereof, will best be understood from the following description when read in connection with the accompanying drawings, in which:

Figure 1 of the drawings is a schematic diagram of an embodiment of the invention; and Figure 2 of the drawings is a circuit diagram of a preferred embodiment of the invention.

Referring now to Figure 1, the schematic diagram of the embodiment of the invention is shown in a system wherein a master tape 10 has applied thereto a reproducing magnetic head 12, the output from which is amplified through a reproducing amplifier 14 and then applied to a recording amplifier 16. The output from the recording amplifier 16 is applied by a recording head 18 to a magnetic tape 20 which is being employed as a copy recording medium for the signals on the original.

A first monitor reading head 22 is positioned on the master tape 10 to detect those signals which have already been recorded therefrom on the copy tape 20. A second monitor head 24 is positioned to detect signals which correspond to the signals being detected by the first monitor head 22. Both of the outputs of these monitor heads are applied to respective monitor amplifiers 26, 28. The output to these amplifiers is applied to an electronic comparator 30, which has its output applied to an error indicator 32.

While the system shown schematically in Figure 1 describes the use of an electronic comparator with the automatic inspection of magnetic tape copy, it will be appreciated that any other two audio signal sources which it is desired to monitor may employ the apparatus which is an embodiment of the invention herein for the purpose of comparing a correct or master record with a copy thereof. Furthermore, it will also be apparent that more than one copy can be monitored simultaneously from the single master from which the copies are being made.

Figure 2 shows a circuit diagram of the electronic comparator and error indicator. The respective monitor amplifier outputs are applied to two transformers 40, 40'. A sensitivity control network 42, 42' is connected across each transformer primary. These are well known commerically available selenium bridge networks used for the purpose of establishing a constant sensitivity of differential over a wide range of input levels. The secondaries 44, 44' of the transformers are connected in series. The outer ends of the secondary windings are respectively connected to two rectifiers 46, 46'. The cathodes of the two rectifiers 46, 46' are each connected to a separate integrating network 48, 48' each consisting of a series resistor 50, 50' and shunt condenser 52, 52'. The integrating networks 48, 48' are connected in an opposing fashion by connecting together one side of the differentiating network condensers 52, 52', and connecting this junction to the series connection of the two input transformer secondary windings. The algebraic difference of the outputs of the integrating networks is then connected from the other side of the condenser 52' through a limiting resistor to the control grid 64' of a vacuum tube 60'. The other side of the condenser 52 is connected to the grid 64 of a vacuum tube 60 through a similar limiting resistor and also to the junction of two cathode bias resistors 68, 68'. Thus, the grid 64 of vacuum tube 60 is tied to a reference potential point while the grid 64' of vacuum tube 60' has applied thereto the algebraic difference of the outputs of the two integrating networks. The vacuum tubes are connected to form a differential amplifier wherein the cathodes 66, 66' of the two tubes each have a separate adjustable cathode bias resistor 68, 68' having one of their ends connected together and the other of their ends connected to the respective cathodes. These cathode bias resistors 68, 68' are made adjustable to permit balancing the current drawn when no signal is being applied. As previously stated, the common cathode connection and one control grid 64 are connected to the output of one of the integrating networks 48. The other control grid 64' is connected to the output of the other integrating network 48'.

A plate load resistor 70, 70' is provided for each of the respective tubes, one end of each plate load resistor 70, 70' being connected to the associated anode 62, 62' and the other end being connected to B+. An error indicating relay 72 has one end of its coil 74 connected to one anode 62 and the other end of its coil connected to the other anode 62'. A potentiometer 76 is connected across the coil to adjust its sensitivity. The relay has a pair of normally open contacts 78. These are connected to an alarm device 80.

The time constants of the integrating networks 48, 48' are made identical and are determined in accordance with the speed of the running of the two tapes, as well as the frequency of the signals being compared. Values for components, as shown in Figure 2, were employed in an operative embodiment of the invention and are suitable for comparing signals in the audio-frequency range. These are not to be construed as a limitation on the invention, however, since it is well within the ability of one skilled in the art to change these values for other frequencies and tape running speeds.

The reason that an integrating network is used is to compensate for the slight differences in phase of the signals being compared which are inserted by the monitor circuits. In practice, the gain of the monitoring amplifiers is adjusted so that the signal levels to be compared are the same. The rectifiers provide half-wave rectification. The integrating networks integrate the rectifier outputs. The algebraic difference of the outputs of the integrating networks is applied to the grid 64' of the push-pull amplifier, the grid 64 being held constant. Any difference in signal from the integrating networks will change the plate current balance of this push-pull system. This enables current to flow through the relay coil, thus closing the contacts and providing an alarm. The alarm may be either a light or a device to stop the recording process until the cause of the difference in signals is corrected.

The error indicating relay is shown by way of example; any other device which is operative in response to a difference in currents or voltages to provide an indication may be used. The differential amplifier also may be replaced by a bridge circuit, or a discriminator circuit, or even a coincidence circuit. Its function is to detect and make available a difference in the outputs of the integrating networks.

This system permits a much more rapid operation of the copying processes to occur, since the limitations on the speed of copying heretofore have been those required to monitor with prior art devices during the copying process. Where the copy is made first and then inspected afterwards, the subsequent inspection now becomes unnecessary. The sensitivity of the comparison can be controlled by the amount of amplification used with the networks. It will be appreciated that signals recorded on mediums other than magnetic recording mediums may be compared (i. e., photographically recorded signals), employing the invention described herein.

There has accordingly been shown and described a novel and useful electronic comparator for comparing the signals on a master recording with those made on a copy.

We claim:

1. In combination, a first medium on which signals have been recorded, a second recording medium, means to record signals on said second medium from said first medium, means to read signals on said first medium which have been recorded on said second medium, means to read signals on said second medium which correspond to the signals being read on said first medium, a pair of rectifiers each of which is coupled to a different one of said means to read signals, a pair of integrating networks each having an input and an output, the input of each of said integrating networks being coupled to a different one of said rectifiers, means coupling the outputs of said integrating networks to oppose each other, a pair of tubes each having an anode control grid and cathode electrode, means coupling the output from each integrating network to a different one of said control grids, a pair of anode load resistors each of which is connected to a different one of said anodes, and a relay having its coil connected between the anodes of said tubes.

2. In combination, a first medium on which signals have been recorded, a second recording medium, means to record signals on said second medium from said first medium, means to read signals on said first medium which have been recorded on said second medium, means to read signals on said second medium which correspond to the signals being read on said first medium, a pair of rectifiers each of which is coupled to a different one of said means to read signals, a pair of integrating networks each having an input and an output, the input of each of said integrating networks being coupled to a different one of said rectifiers, means coupling the outputs of said integrating networks to oppose each other, a pair of tubes each having an anode control grid and cathode electrode, a pair of cathode bias resistors, one end of each of said bias resistors being respectively connected to the cathodes of said pair of tubes and the other end of said cathode bias resistors being connected together, means coupling the output of one of said integrating networks to one of the control grids of said tubes, means coupling the output of the other of said integrating networks to the other of said control grids and to the connected together ends of said pair of cathode bias resistors, a pair of anode load resistors each of which is connected to a different one of said anodes, and indicating means connected to the anodes of said pair of tubes to indicate a difference in signals being read from said first and second mediums.

3. A system as recited in claim 2 wherein said pair of integrating networks each includes a series resistor having one end coupled to one of said rectifiers, and a shunt condenser, one end of each shunt condenser being connected to the other end of a respective one of said series resistors, and wherein said means coupling the outputs of said integrating networks to oppose each other includes means connecting the other ends of said shunt condensers together.

4. In combination, a first medium on which signals have been recorded, a second recording medium, means to record signals on said second medium from said first medium, means to read signals on said first medium which have been recorded on said second medium, means to read signals on said second medium which correspond to the signals being read on said first medium, a pair of input transformers each of which has a primary and a secondary winding, means to couple each of said primary windings to a different one of said means to read signals, means to connect one end of said secondary windings together, a pair of rectifiers each having an anode and a cathode, means connecting each of said rectifier anodes to a different one of said secondary winding other ends, a pair of integrator networks each including a series resistor and a shunt condenser, one end of each series resistor being respectively connected to a different one of said rectifier cathodes, the other end of each series resistor being connected to one end of a shunt condenser, means connecting the other ends of said shunt condensers together and to said connected together secondary transformer windings, a pair of tubes each having an anode, cathode and control grid, means respectively connecting the other ends of said series resistors to a different one of said control grids, a pair of cathode bias resistors, means connecting one end of each of said cathode bias resistors together and to one of said control grids, means connecting the other end of said cathode bias resistors to a different one of said cathodes, a pair of anode load resistors each of which is connected to a different one of said anodes, and indicating means coupled to the anodes of both said tubes to indicate a difference in currents drawn by said tubes responsive to a difference in signals being read from said first and second mediums.

References Cited in the file of this patent

UNITED STATES PATENTS

| | | |
|---|---|---|
| 2,628,346 | Burkhart | Feb. 10, 1953 |
| 2,700,755 | Burkhart | Jan. 25, 1955 |

FOREIGN PATENTS

| | | |
|---|---|---|
| 669,483 | Great Britain | Apr. 2, 1952 |